(12) United States Patent
Drochon et al.

(10) Patent No.: US 8,251,143 B2
(45) Date of Patent: Aug. 28, 2012

(54) LOW PERMEABILITY CEMENT SYSTEMS FOR STEAM INJECTION APPLICATION

(75) Inventors: Bruno Drochon, Houston, TX (US); Frederic Thery, Banadaraya (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 482 days.

(21) Appl. No.: 12/520,421

(22) PCT Filed: Dec. 13, 2007

(86) PCT No.: PCT/EP2007/010959
§ 371 (c)(1), (2), (4) Date: Nov. 2, 2009

(87) PCT Pub. No.: WO2008/077501
PCT Pub. Date: Jul. 3, 2008

(65) Prior Publication Data
US 2010/0065272 A1    Mar. 18, 2010

(30) Foreign Application Priority Data
Dec. 27, 2006    (EP) .................................. 06127253

(51) Int. Cl.
*E21B 33/138* (2006.01)
*E21B 33/14* (2006.01)
*C04B 16/00* (2006.01)
*C04B 16/02* (2006.01)
*C09K 8/467* (2006.01)

(52) U.S. Cl. ........ 166/288; 106/660; 106/822; 166/293; 166/294; 166/295; 507/231; 507/269; 524/2

(58) Field of Classification Search .......... None
See application file for complete search history.

(56) References Cited

U.S. PATENT DOCUMENTS

| | | | |
|---|---|---|---|
| 3,368,623 A | 2/1968 | Carter et al. | |
| 3,998,269 A | 12/1976 | Lybarger | |
| 4,094,694 A | 6/1978 | Long | |
| 4,537,918 A * | 8/1985 | Parcevaux et al. | 523/130 |
| 4,721,160 A * | 1/1988 | Parcevaux et al. | 166/293 |
| 4,972,906 A | 11/1990 | McDaniel | |
| 6,656,263 B2 * | 12/2003 | Audibert et al. | 106/696 |
| 7,530,396 B1 * | 5/2009 | Reddy et al. | 166/293 |
| 2002/0062764 A1 * | 5/2002 | Audibert et al. | 106/802 |
| 2004/0045713 A1 * | 3/2004 | Bianchi et al. | 166/293 |
| 2006/0144300 A1 * | 7/2006 | Touzet et al. | 106/802 |
| 2011/0290493 A1 * | 12/2011 | James | 166/310 |

FOREIGN PATENT DOCUMENTS

| | | |
|---|---|---|
| CN | 1718652 | 1/2006 |
| DE | 19522723 | 7/1996 |
| RU | 2236424 C2 | 9/2004 |
| WO | 2004078671 | 9/2004 |
| WO | 2004101463 | 11/2004 |

OTHER PUBLICATIONS

Danyushevskiy M.S. "Spravochnoe rukovodstvo po tamponazhnym materialam" Moscow, Nedra, 1987, pp. 6-8.

* cited by examiner

*Primary Examiner* — George Suchfield
(74) *Attorney, Agent, or Firm* — Matthias Abrell

(57) ABSTRACT

A cement slurry composition comprises a plugging agent with a glass-transition temperature lower than about 150° C. The plugging agent is preferably an including polyethylene wax, polypropylene wax, carnauba wax or scale wax. After the cement slurry sets, it may be heated to a temperature sufficient to melt the wax. The molten wax may then flow into pores in the set cement. Upon cooling, the wax solidifies. As a result, the porosity and permeability of the set cement are reduced.

20 Claims, 2 Drawing Sheets

LOW PERMEABILITY CEMENT SYSTEMS FOR STEAM INJECTION APPLICATION

TECHNICAL FIELD

This invention relates to a cement additive for the use in cementing oil wells or the like, in particular the invention relates to a low glass transition point (Tg) polymer as a plugging agent for a cement composition.

BACKGROUND

The statements in this section merely provide background information related to the present disclosure and may not constitute prior art.

In a general well cementing operation, a cement slurry is prepared at the surface and pumped into the well to fill the annulus between the casing and the borehole wall to provide zonal isolation and mechanical support. Interest in the recovery of heavy oil is increasing because of the huge reserves of heavy oil existing whereas reserves of light oil are decreasing. Thermal recovery processes are one of the main means of recovering heavy oils. Thermal methods work by increasing the temperature of the oil which will decrease the viscosity of the oil. One of the main thermal methods used is steam injection. However one of the issues for zonal isolation is the permeability of cement after steam injection operations. When initially set, the cement can provide a good seal, however changes in pressure and temperature during repeated steam injection procedures can induce stresses and affect the integrity of the cement.

Systems used for such application are typically conventional low density cement which become highly permeable after a few steam injection cycles. It is common that temperatures around 300° C. are reached within the cement sheath and generally the set cement will lose strength and gain permeability after regular steam injection. This can cause zonal isolation to be lost and induce cored casing and/or steam leakage. As such the lifetime of thermal recovery wells is shortened by all these stresses the cement is placed under.

Lost circulation problems often occur due to weak and unconsolidated formations of such wells therefore low density cement systems are required however this is detrimental in terms of set cement properties, as water permeability of set cement is inversely proportional to the density of conventional cement. Heavy oil wells exposed to thermal recovery processes belong mainly to the low tier markets where low slurry pricing is a key point to be competitive.

One cement system developed, FlexSTONE (Schlumberger), maintains high compressive and tensile strengths compared to conventional cements, and is used in steam flood operations. However the permeability of the cement is still a problem at 300° C.

Therefore the object of the invention is to provide a cost effective additive to increase the long-term permeability performances of set cement.

SUMMARY

A first aspect of the invention comprises a cement slurry composition comprising a plugging agent polymer with a low Tg point.

The polymer can have a Tg point below 150° C. Having a low Tg point means that the polymer will melt at temperatures reached during thermal operations in the well, and flow into the pores of the cement matrix.

Preferably the polymer in the cement slurry composition is a wax. In a preferred composition the polymer is a polyethylene wax emulsion, polypropylene wax emulsion, carnauba wax emulsion or a scale wax emulsion. Waxes are a cost efficient additive that can be used.

A cement slurry composition can be a low density cement.

A second aspect of the invention comprises a method for plugging the porosity of a cement matrix in a well comprising pumping the cement slurry according to any of the preceding claims into a well; setting the cement in a well; heating the cement above the Tg point of the additive; and cooling the cement so that the additive will solidify.

Preferably the method comprises performing a steam injection operation to heat the cement.

A method for lowering the permeability of a cement composition in a well comprising: adding a polymer with a low Tg point to a cement slurry; and pumping the cement slurry into a well.

DETAILED DESCRIPTION OF SOME EMBODIMENTS OF THE INVENTION

Figure 1:
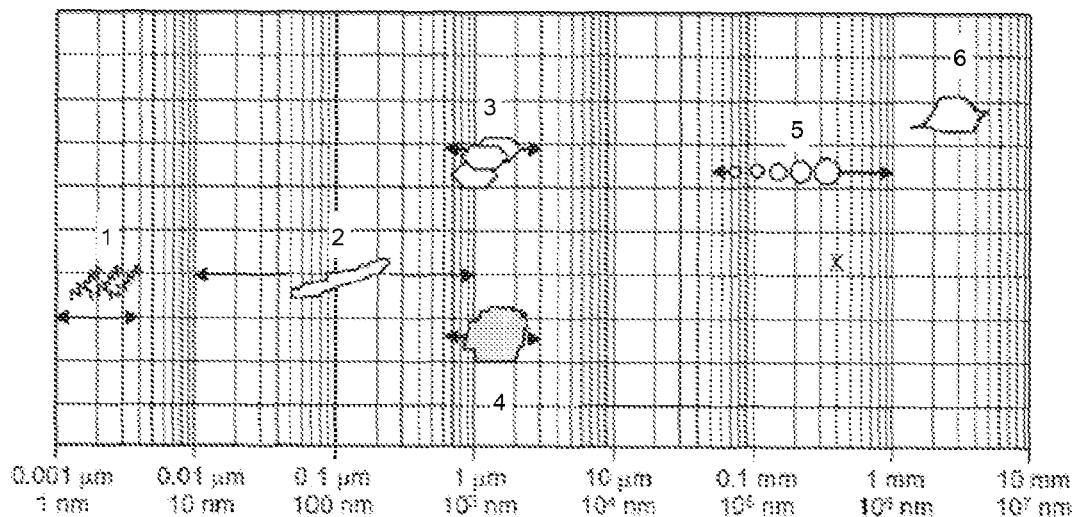
FIG. 1 shows the dimensional range of solids and pores in hydrated cement paste.
Figure 2:
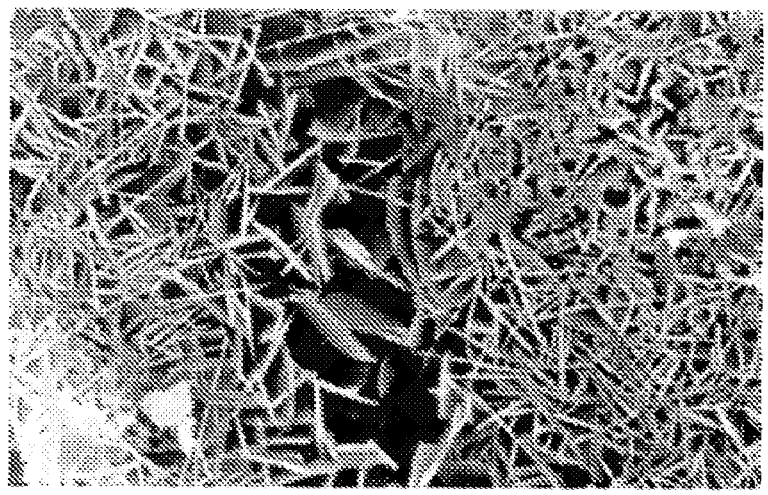
FIG. 2 shows a SEM of a capillary pores in a hardened cement paste.
Figure 3:
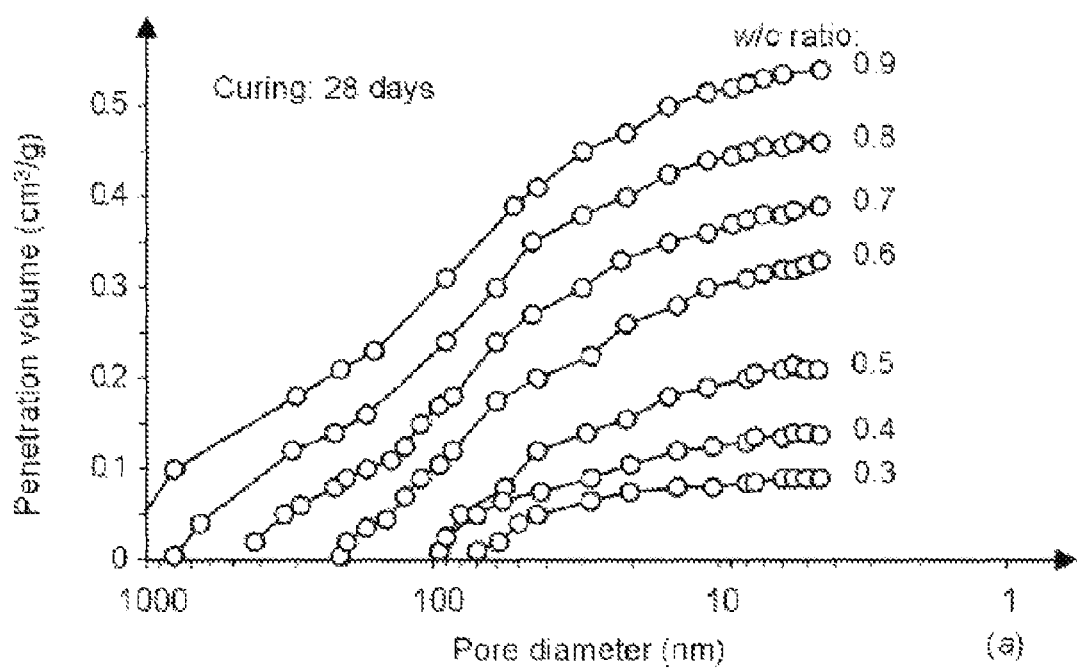
FIG. 3 shows a graph of pore diameter (nm) versus penetration volume ($cm^3/g$).

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range When the cement is hydrated, interconnected pores of different sizes are formed, as shown in FIG. 1. Pores in the cement matrix are formed by interparticle spacing between C—S—H sheets 1, capillary voids 2, hexagonal crystals of $Ca(OH)_2$ or low sulphate in cement paste 3, aggregation of C—S—H particles 4, entrained air bubbles 5, entrapped air voids 6. The pores can be divided into macropores, capillary pores and gel pores. The interlayer spacing between C—S—H (gel pores) typically have a volume equal to about 28% of the gel and dimensions ranging from a few fractions of nm to several nm. These types of pores do not affect the durability of the material because they are too small to allow significant transport of aggressive species. The capillary pores are the voids not filled by the solid products of hydration of hardened cement paste. FIG. 2 shows a cement consisting of micro-capillaries between the plate shaped crystals, a macro-capillary is also visible. The capillary pores typically have the dimensions of 10 nm to 1 micron, depending on the curing time and on the water to cement ratio. FIG. 3 depicts the pore diameter versus penetration volume. The capillary pores govern the durability of the material. To prevent interzonal communication, the permeability to water should not exceed 0.1 mD. Therefore the invention provides cement slurries having solid particles that will fill the marcopores and when melted can flow through the smaller pores to reduce the pore interconnections, and therefore the permeability of the cement.

Solid particles of the additive are introduced into the cement slurry. The particles have a size that allows the particles to be inserted into the macropores when the cement is hydrated, then when the temperature goes above the melting of these particles (during steam injection), the melted fluid flows through smaller pores reducing the pores interconnections.

When the formation temperature is higher than the Tg of the polymer, such as during steam injection operation, the polymer will melt. Once the steam injection is over, temperature will cool down and the organic additive will solidify. Once the polymer is melted it is able to flow through the cement matrix, thus the polymer mobility will increase, and plug the microporosity of the cement. The formation fluids will first be blocked by the liquid state of the polymer during the steam injection operation and then by the resolidified polymer once the thermal recovery process is stopped and the cement matrix has cooled down. Water permeability of the set cement will be reduced because of the build up of plugs in the connected porosity. Only a few different areas in the connected porosity need to be plugged to be efficient and to maintain a low cement permeability.

The additive can be products such as styrene-butadiene latex, polypropylene, or waxes. Preferred products are water based wax emulsions, as they contain a high content of solid for a low viscous fluid, as for a latex, but will not form a film during the hydration of cement, contrary to latex. Waxes are also cost effective. Preferred products include:

| Material | Commercial name | Particle size | Melting point |
|---|---|---|---|
| Polyethylene Wax Emulsion | Michem ® Emulsion 39235 | 0.35μ | 139° C. |
| Polypropylene Wax Emulsion | Michem ® Emulsion 43040 | 0.45μ | 157° C. |
| Carnauba Wax Emulsion | Michem ® Emulsion 67135 | 0.150μ | 82° C. |
| Scale Wax Emulsion | Michem ® Emulsion 70750.E | 0.500μ | 50° C. |

EXAMPLES

A water permeability set-up working around 60-70° C. is used. Candidate polymer additives with a Tg around 40-50° C. are selected. Three heavy oil cement systems are prepared:

1. Reference system:
   13.3 ppb with Class A
   40% BWOC silica flour
   Antifoam—polypropylene glycol
   0.2% BWOC TIC dispersant
   2% BWOC extender—bentonite
   This formulation is labelled "thermal 40% in Canada"
2. Thermal 40% with 2 gal/sk of scale wax emulsion (Michem® Emulsion 7050 0.5 microns SVF=52% melting point 50° C.):
   1% extender—bentonite
   0.7% TIC dispersant
   0.05 gps antifoam additive
3. 12.75 ppg slurry with an oil and water emulsion—SVF is 30% Class A cement with 40% BWOC silica flour
   28% by volume of slurry of oil
   42% by volume of slurry of water
   2.5% by weight of oil of gas-control agent
   a few grams of TIC dispersant Sample Preparation The sample are mixed and undergo a first curing of 1 week at 40° C. A few cores of 2-inch length/1 inch diameter are extracted from each system. Then the samples are cured at 275° C. (525° F.) for 6 hours. Maximum temperatures is maintained for 45 hours, then cool down gently.

The curing time at 275° C. is repeated for 1 week and then the samples are cooled down gently. This ensures that the reference system has deteriorated sufficiently (permeability>0/1 mD).

Water permeability measurements of the three samples are taken at room temperature, and over 60° C. (>melting point of the wax emulsion) and at 140° C. for the reference and wax systems.

Results:

| Sample Identification | Specific permeability, mD | Core description |
|---|---|---|
| Three 1" diameter cement plug samples, measurements at room temperature | | |
| Ref | 0.184 | Med grey, fine-med mottled texture, good plug |
| Wax | 0.205 | Med grey, fine-med mottled texture, good plug |
| O/E | 0.715 | lt grey, fine-med mottled texture, good plug |
| Two 1" diameter cement plug samples, measurements at 140° C. | | |
| Ref | 0.236 | Med grey, fine-med mottled texture, good plug |
| Wax | 0.092 | Med grey, fine-med mottled texture, good plug |

Crush tests after curing −1 cylinder/system
1. Ref=3200 psi
2. Wax=1900 psi
3. O/E=1800 psi After crushing a purple/blue colour in the matrix of system 2 is observed.

Although the oil droplets of the O/E act as fine particles for the rheology/FL testing, but do not block the water permeability. A ratio of 5 between wax and the reference systems is expected, and confirms that wax can be used as an additive to plug the gaps in the cement.

The water permeabilities are similar at room temperature (0.18 and 0.20 mD). This is expected and the value agrees with the extended system.

At 140° C., the water permeabilities are no longer similar between the reference and wax systems. The wax system has lower water permeability than the reference system, 0.09 compared to 0.236 mD. The water permeability of the wax system at 140° C. is lower than at room temperature, 0.09 compared to 0.205 mD.

As can be seen from the comparative measurements of water permeability the melted polymer has the ability to lower the connected porosity of a cement matrix. Concentration, molecular weight and particle shape will also have an impact on the mobility of the melted polymer.

The invention claimed is:

1. A method for plugging the porosity of a cement matrix in a well comprising: pumping into the well a cement slurry comprising a plugging agent polymer with a glass transition point below 150° C.; setting the cement in the well; heating the cement above the glass transition point of the plugging agent polymer; and cooling the cement so that the plugging agent polymer will solidify.

2. The method according to claim 1 wherein a steam injection operation is performed to heat the cement.

3. The method according to claim 1 wherein the polymer is a wax.

4. The method according to claim 1 wherein the polymer is a polyethylene wax emulsion, polypropylene wax emulsion, carnauba wax emulsion or a scale wax emulsion.

5. The method according to claim 1 wherein the polymer is a styrene-butadiene latex.

6. The method according to claim 1 wherein the polymer is polypropylene.

7. The method according to claim 1 wherein the cement is a low density cement.

8. The method according to claim 1 wherein the polymer has a glass transition point between about 40° C. and about 50° C.

9. The method according to claim 1 wherein the slurry further comprises at least one of polypropylene glycol, silica flour, dispersants, extenders, antifoam additive, or gas-control agents.

10. A method for lowering the permeability of a cement composition in a well comprising: adding a polymer with a glass transition point below 150° C. to a cement slurry; pumping the cement slurry into a well setting the cement in the well; heating the cement above the glass transition point of the polymer; and cooling the cement so that the polymer will solidify.

11. The method according to claim 10 wherein the polymer is a wax.

12. The method according to claim 10 wherein the polymer is a polyethylene wax emulsion, polypropylene wax emulsion, carnauba wax emulsion or a scale wax emulsion.

13. The method according to claim 10 wherein the polymer is a styrene-butadiene latex.

14. The method according to claim 10 wherein the polymer is polypropylene.

15. The method according to claim 10 wherein the cement is a low density cement.

16. The method according to claim 10 wherein the polymer has a glass transition point between about 40° C. and about 50° C.

17. The method according to claim 10 wherein the slurry further comprises polypropylene glycol.

18. The method according to claim 10 wherein the slurry further comprises at least one of polypropylene glycol, silica flour, dispersants, extenders, antifoam additive, or gas-control agents.

19. A method for treating a subterranean formation comprising preparing a cement slurry composition comprising a polymer with a glass transition point below 150° C.; pumping the cement slurry into a well; setting the cement in the well; heating the cement above the glass transition point of the polymer; and cooling the cement so that the polymer will solidify.

20. The method according to claim 19 wherein the polymer has a glass transition point between about 40° C. and about 50° C.

* * * * *